No. 817,726. PATENTED APR. 10, 1906.
W. M. RICH.
TRANSFORMABLE DRAFT EQUALIZER.
APPLICATION FILED SEPT. 29, 1905.
2 SHEETS—SHEET 1.
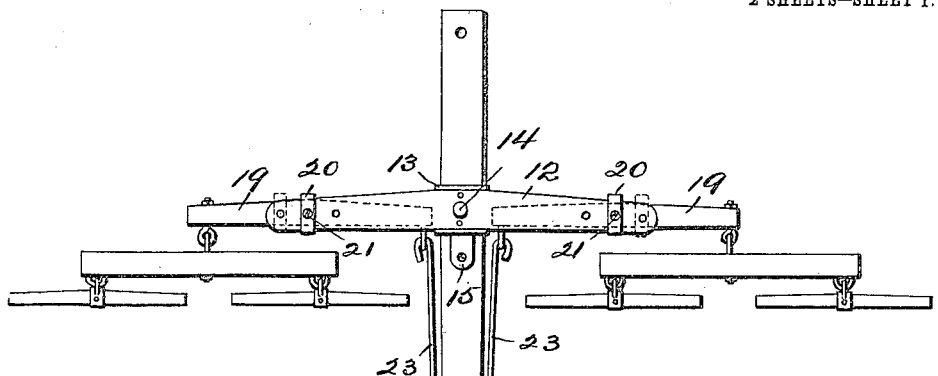
Fig. 1.
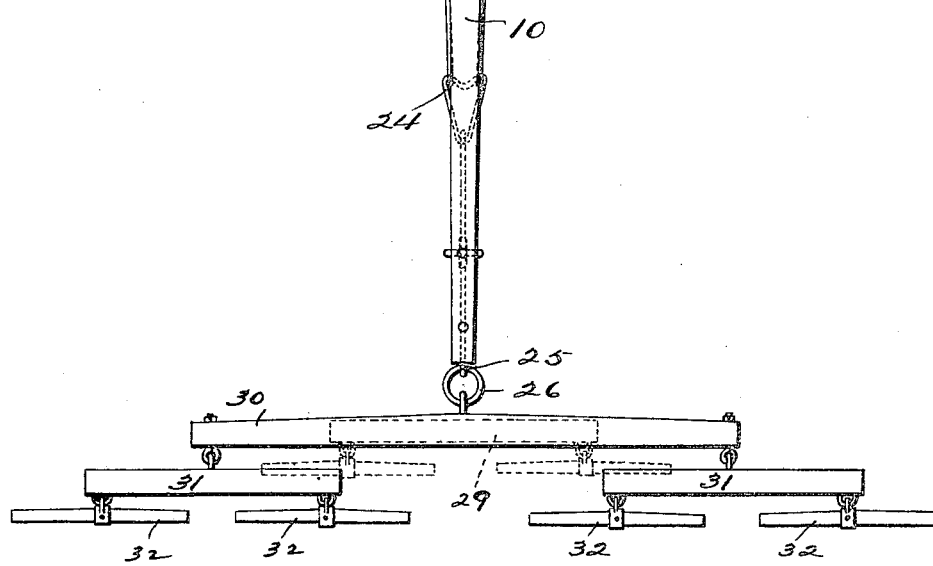
Witnesses: Inventor: William M. Rich,
By Thomas G. Orwig, Attorney.

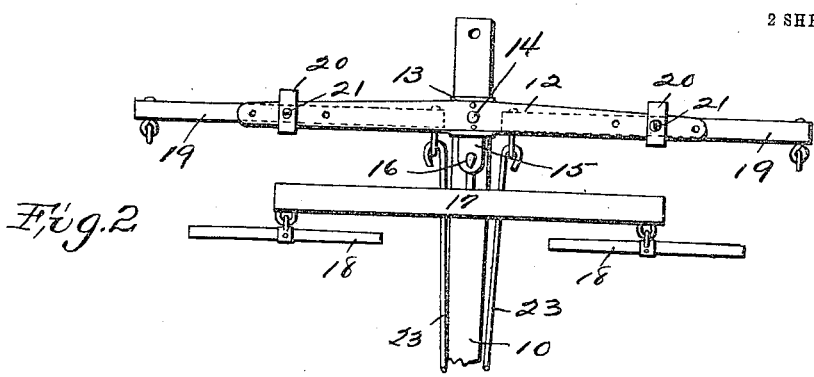
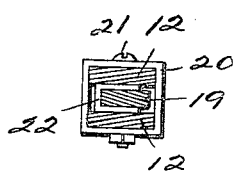
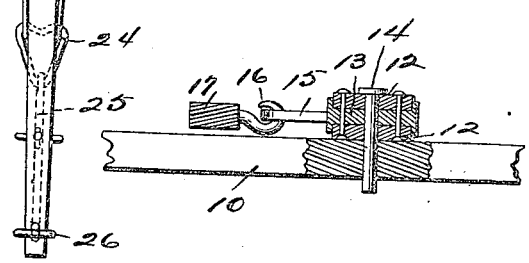
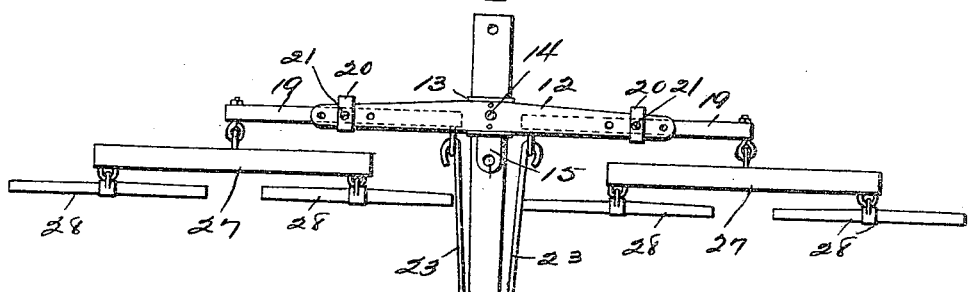

UNITED STATES PATENT OFFICE.

WILLIAM M. RICH, OF COOPER, IOWA, ASSIGNOR OF ONE-HALF TO EDGAR ALLEN, OF COOPER, IOWA.

TRANSFORMABLE DRAFT-EQUALIZER.

No. 817,726.　　　Specification of Letters Patent.　　　Patented April 10, 1906.

Application filed September 29, 1905. Serial No. 281,052.

*To all whom it may concern:*

Be it known that I, WILLIAM M. RICH, a citizen of the United States, residing at Cooper, in the county of Greene and State of Iowa, have invented a new and useful Transformable Draft-Equalizer, of which the following is a specification.

My object is to provide a transformable draft-equalizer adapted to be used on wagons for two horses and on plows, road-graders, harvesters, and the like for four, six, and eight horses at different times.

My invention consists in the construction, arrangement, and combination of parts, as hereinafter set forth, pointed out in my claims, and illustrated in the accompanying drawings, in which—

Figure 1 is a plan view showing the positions of all parts relative to each other and a pole when used as an eight-horse equalizer. Dotted lines indicate the transformation required to use the invention as a six-horse equalizer. Fig. 2 shows the invention adjusted for use as a two-horse equalizer. Fig. 3 shows it arranged for use as a four-horse equalizer. Fig. 4 is a sectional view of Fig. 2. Fig. 5 is a sectional view of Fig. 2.

The numeral 10 designates a pole, and 12 is the main evener pivoted to the pole. It is composed of two overlying parts fitted to a flanged metal plate 13, as shown in Fig. 4. Coinciding bolt-holes in the overlying parts and the pole admit a pin or bolt 14, as required, to pivotally connect them with the pole. An integral extension 15 at the front end of the plate 13 is provided with a perforation to admit a hook 16, extending rearward from a second evener 17, thus detachably connected with the main evener 12. Swingletrees on the ends of the evener adapt the invention to be advantageously used for hitching two horses thereto.

Two auxiliary eveners 19 are pivotally and adjustably connected with the main evener 12 by means of metal collars 20 and screw-bolts 21, as shown in Fig. 5. Metal loops 22 are placed on the eveners 19 and serve as washers between the eveners and the collars.

Rods 23 are pivotally connected with the inner ends of the auxiliary eveners 19 and their front ends connected with a triangular frame 24, to which is connected a rod 25, that has a ring 26 at its front end adapted to be placed on the front end of the pole 10, as indicated in dotted line in Fig. 2, when the auxiliary eveners are retained dormant in the main evener, and when the auxiliary eveners are in such dormant position doubletrees 27 are connected to their ends and swingletrees 28 to their ends, as shown in Fig. 1.

To hitch six horses to the equalizer, the auxiliary eveners are pivoted to the outer ends of the main evener 12 and a doubletree 29 connected with the ring 26 and swingletrees to its ends, as indicated by dotted lines in Fig. 1, or there may be two horses at the rear of the pole and four horses at the front of it, and in order to so hitch them the auxiliary eveners 19 must be moved to the third and innermost bolt-holes in the main evener 12 and swingletrees connected with the outer ends of the auxiliary evener.

To hitch eight horses thereto, an evener 30 is connected with the ring 26, doubletrees to its ends, and swingletrees 32 to the ends of the doubletrees, as shown in Fig. 1.

Having thus set forth the purpose of my invention and its construction and manner of use, the practical operation and utility thereof is thereby explained and obvious to persons familiar with the art to which it pertains.

What I claim as new, and desire to secure by Letters Patent, is—

1. In a transformable draft-equalizer, a doubletree composed of two overlying parts pivotally connected at their centers with a pole, collars on their end portions and auxiliary eveners between the end portions of the overlying parts extended through the collars and pivotally connected therewith.

2. In a transformable draft-equalizer, an evener consisting of two overlying parts having coinciding perforations at their centers, a flanged plate between them and provided with a perforation and a forward extension and the three parts bolted together and jointly pivoted to a pole.

3. In a transformable draft-equalizer, an evener consisting of two overlying parts having coinciding perforations at their centers, a flanged plate between them and provided with a perforation and a forward extension and the three parts bolted together and jointly pivoted to a pole and auxiliary eveners adjustably connected with the free end portions of the two overlying parts of the main evener.

4. In a transformable draft-equalizer, an evener consisting of two overlying parts having coinciding perforations at their centers, a flanged plate between them and provided with a perforation and a forward extension and the three parts bolted together and jointly pivoted to a pole, and auxiliary eveners adjustably connected with the free end portions of the two overlying parts of the main evener by means of a collar and bolt, as shown.

5. In a transformable draft-equalizer, an evener consisting of two overlying parts having coinciding perforations at their centers, a flanged plate between them and provided with a perforation and a forward extension and the three parts bolted together and jointly pivoted to a pole, and auxiliary eveners adjustably connected with the free end portions of the two overlying parts of the main evener by means of a collar and bolt and a loop.

6. In a transformable draft-equalizer, an evener consisting of two overlying parts having coinciding perforations at their centers, a flanged plate between them and provided with a perforation and a forward extension and the three parts bolted together and jointly pivoted to a pole, and auxiliary eveners adjustably connected with the free end portions of the two overlying parts of the main evener by means of a collar, bolt and loop and means extended from the inner end of the auxiliary eveners to the front end of the pole for connecting eveners therewith.

7. In a transformable draft-equalizer, a pole, a main evener composed of overlying parts pivoted to the pole, auxiliary eveners between the end portions of the overlying parts pivotally and adjustably connected with the main evener, collars on the auxiliary eveners, rods connected with the inner ends of the auxiliary eveners and a single rod flexibly connected with their front ends, a ring on the front end of the rod, a doubletree connected with the ring and a swingletree with each end of the doubletree, to operate as set forth.

8. A transformable draft-equalizer comprising an evener composed of overlying parts pivoted to a pole, collars on the end portions of the overlying parts, auxiliary eveners adjustably pivoted to the ends of the said main evener and within said collars, doubletrees connected with the outer ends of the auxiliary eveners, swingletrees on the ends of the doubletrees, rods connected with the inner ends of the auxiliary eveners and their front ends connected with a single rod provided with a ring on its free end, an evener connected with the ring and doubletrees connected with its ends and swingletrees with the ends of the doubletrees, to operate in the manner set forth.

WILLIAM M. RICH.

Witnesses:
  C. H. Chapin,
  Geo. P. McBurney.